United States Patent
Kozlowski, Jr. et al.

(10) Patent No.: US 9,939,722 B2
(45) Date of Patent: Apr. 10, 2018

(54) PROJECTION SCREENS AND RELATED SYSTEMS AND METHODS

(71) Applicant: WirePath Home Systems, Charlotte, NC (US)

(72) Inventors: William Jacob Kozlowski, Jr., Waxhaw, NC (US); Christopher Glenn Franck, Fort Mill, SC (US); Matthew R. Shute, Huntersville, NC (US)

(73) Assignee: WirePath Home Systems, LLC, Charlotte, NC (US)

( * ) Notice: Subject to any disclaimer, the term of this patent is extended or adjusted under 35 U.S.C. 154(b) by 0 days.

(21) Appl. No.: 15/293,976

(22) Filed: Oct. 14, 2016

(65) Prior Publication Data
US 2017/0108765 A1    Apr. 20, 2017

Related U.S. Application Data

(60) Provisional application No. 62/241,602, filed on Oct. 14, 2015.

(51) Int. Cl.
*G03B 21/58*        (2014.01)

(52) U.S. Cl.
CPC .................... *G03B 21/58* (2013.01)

(58) Field of Classification Search
CPC ...................................................... G03B 21/58
USPC ........................................................ 359/461
See application file for complete search history.

(56) References Cited

U.S. PATENT DOCUMENTS

| | | | | |
|---|---|---|---|---|
| 3,205,772 A | * | 9/1965 | Guske | G03B 21/58 248/246 |
| 5,341,241 A | * | 8/1994 | Shopp | G03B 21/58 359/443 |
| 6,111,694 A | * | 8/2000 | Shopp | G03B 21/58 160/23.1 |
| 6,336,616 B1 | * | 1/2002 | Lin | G03B 21/58 248/222.11 |
| 6,421,175 B1 | * | 7/2002 | Shopp | G03B 21/58 160/310 |
| 2011/0235173 A1 | * | 9/2011 | Tsai Chen | G03B 21/56 359/461 |
| 2012/0268815 A1 | * | 10/2012 | Hendricks | G03B 21/58 359/461 |
| 2013/0235455 A1 | * | 9/2013 | Qingjun | G03B 21/58 359/461 |

* cited by examiner

*Primary Examiner* — Christopher Mahoney
(74) *Attorney, Agent, or Firm* — Myers Bigel, P.A.

(57) ABSTRACT

A projection screen system includes a housing defining a channel, a screen and motor assembly including a projection screen and a tubular motor, and first and second opposed mounting features configured to hold the screen and motor assembly in the channel of the housing. The housing is configured to be installed recessed in a ceiling and the screen and motor assembly is configured to be mounted in the housing of the installed housing such that the installation of the housing and the mounting of the screen and motor assembly are performed independently.

17 Claims, 11 Drawing Sheets

PROJECTION SCREENS AND RELATED SYSTEMS AND METHODS

RELATED APPLICATIONS

This application claims priority from U.S. Provisional Application No. 62/241,602, filed Oct. 14, 2015, the disclosure of which is hereby incorporated herein in its entirety.

BACKGROUND

Conventional recessed projection screen systems include a housing and a screen and motor assembly. The screen and motor assembly is typically held in the housing such that a user installs the entire system in the ceiling at once. Also, the entire system is removed from the ceiling if the screen and motor assembly needs servicing. It would be desirable to provide a projection screen system that allows for the housing and the screen and motor assembly to be installed and uninstalled separately.

SUMMARY

Some embodiments of the present invention are directed to a projection screen system. The system includes a housing defining a channel, a screen and motor assembly including a projection screen and a tubular motor, and first and second opposed mounting features configured to hold the screen and motor assembly in the channel of the housing. The housing is configured to be installed recessed in a ceiling and the screen and motor assembly is configured to be mounted in the housing of the installed housing such that the installation of the housing and the mounting of the screen and motor assembly are performed independently.

Some other embodiments of the present invention are directed to a method including providing a projection screen system including: a housing defining a channel; a screen and motor assembly including a projection screen and a tubular motor; and first and second opposed motor brackets configured to hold the screen and motor assembly in the channel of the housing. The method includes installing the housing recessed in a ceiling and then mounting the screen and motor assembly in the housing that is installed recessed in the ceiling.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
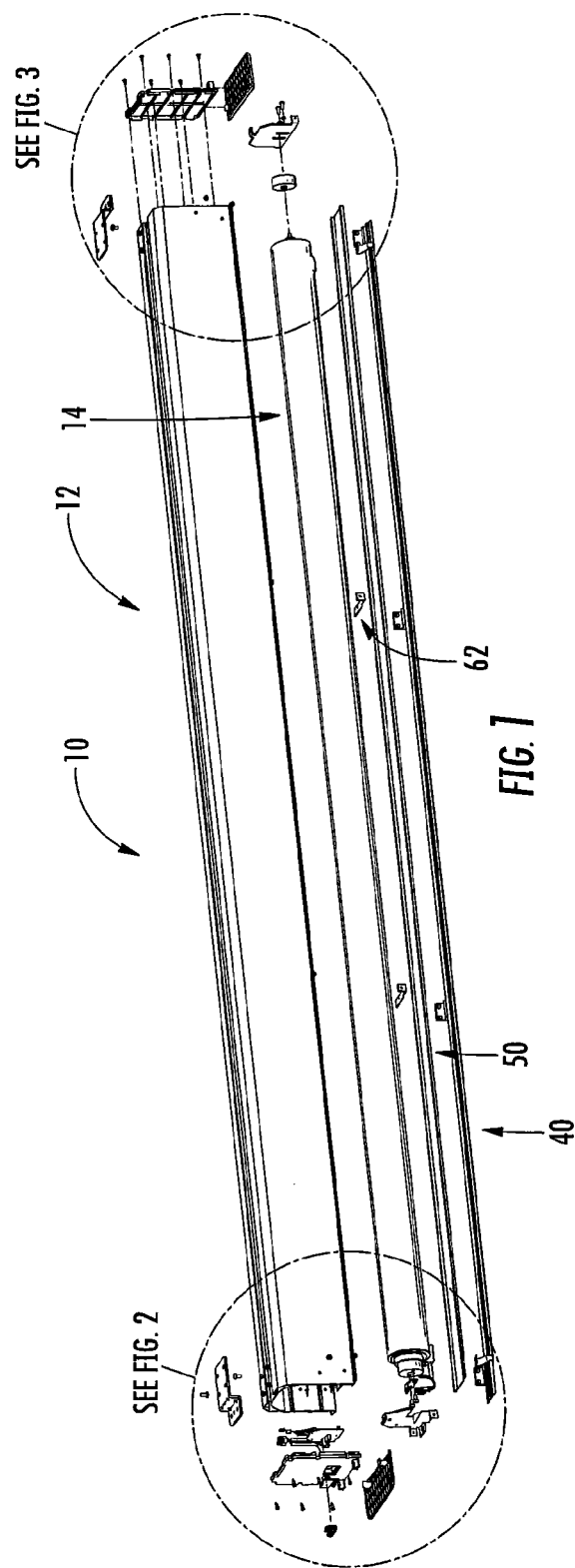
FIG. 1 is an exploded view of a recessed projection screen system according to some embodiments.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A recessed screen system 10 according to some embodiments is illustrated in FIGS. 1-5. The system 10 includes a chassis or housing 12 and a screen and motor assembly 14. The housing 12 includes first and second opposite sidewalls 13, 15.

The housing 12 defines a channel 16 that is sized and configured to receive the screen and motor assembly 14. As described in more detail below, the housing 12 is configured to be installed recessed in a ceiling with the screen and motor assembly 14 releasably mounted in the housing 12.

The screen and motor assembly 14 includes a screen tube 18 and a screen 20 wrapped or wound around the screen tube 18. The assembly 14 includes a motor 22 (e.g., a tubular motor) that is received in the screen tube 18. The motor 22 is reversible and is configured to unwind and wind the screen 20 to thereby lower and raise the screen 20 (e.g., relative to the ceiling).

A motor bracket 24 and a fixed end bracket 26 are coupled to the housing 12 at opposite end portions thereof. The brackets 24, 26 hold the screen and motor assembly 14 in the housing 14.

A wire harness 28 electrically connects the motor 22 and a printed circuit board (PCB) assembly 30. The PCB assembly 30 may include a controller or microprocessor that directs the motor 22 to operate responsive to, e.g., actuation of a remote control or a wall switch.

According to some embodiments, first and second end caps 32, 34 are coupled to opposite ends of the housing 12. According to some other embodiments, the housing 12 and the end caps 32, 34 are integrally formed.

A hinge door or hinge door extrusion 40 is coupled to the first sidewall 13 of the housing 12 by a plurality of hinges 44. A plurality of hinge door tabs 46 are coupled to the hinge door 40 along the length of the hinge door 40. When the screen 20 is lowered, the screen 20 contacts the tabs 46 causing the hinge door 40 to pivot about the hinges 44 to an open position (e.g., about 90 degrees from the position shown in FIG. 5). When the screen is raised, the screen 20 and the tabs 46 engage one another causing the hinge door 40 to pivot about the hinges 44 to a closed position (e.g., the position shown in FIG. 5).

An access or trim panel 50 includes first and second side portions. A lengthwise channel 52 is at the first side portion. A flange 54 extending from a bottom portion of the second sidewall 15 of the housing 12 is received in the channel 52 such that the panel 50 is pivotably connected to the second sidewall 15 of the housing 12.

A second lengthwise channel 56 is at the second side portion of the panel 50. A plurality of magnetic members 58 are in the channel 56 at spaced apart locations along its length.

A plurality of magnetic bracket assemblies are coupled to the second sidewall 15 of the housing 12 at spaced apart locations along its length. Specifically, the magnetic bracket assemblies have proximal and distal end portions and are coupled to the housing second sidewall 15 at their proximal ends. According to some embodiments, first and second stationary magnetic brackets are disposed at opposite end portions of the housing 12 and first and second pivot magnetic brackets 62 are disposed between the stationary magnetic brackets. The stationary magnetic brackets may be omitted. It is contemplated that only one pivot magnetic bracket 62 or more than two pivot magnetic brackets 62 may be employed.

Figure 3:
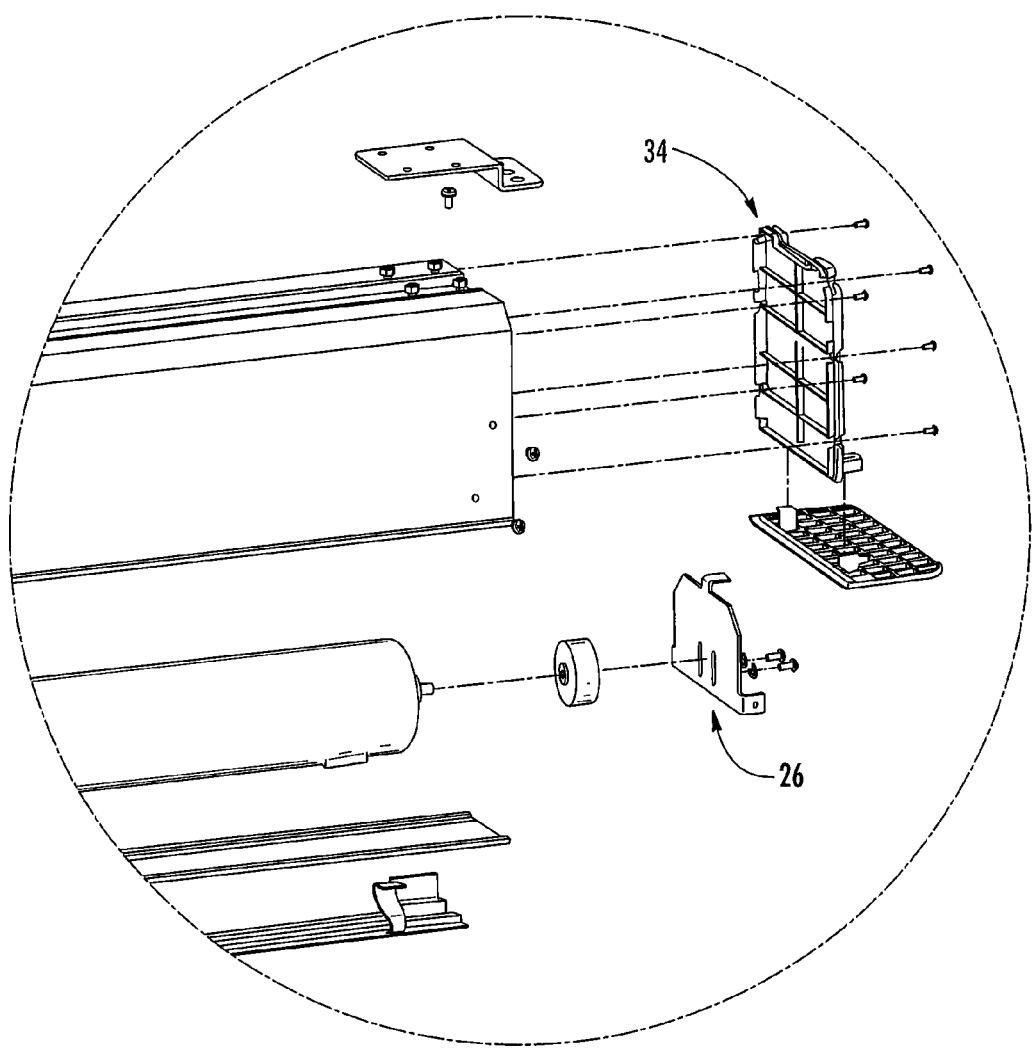
FIG. 3 is an exploded fragmentary view illustrating the indicated portion of FIG. 1.

The magnetic brackets 62 are each positioned on one of the magnetic members 58. The access panel 50 is movable between a closed position (e.g., as shown in FIG. 3) and an open position with the access panel rotated downwardly to expose the housing channel 16.

The panel 50 is held in the closed position by magnetic attraction between the brackets 62 and the magnetic members 58. A bumper 66 may be at the distal end portion of each of the brackets 62 and reside on the hinge door 40. The bumper 66 may be a rubber stop.

The pivot brackets 62 may include a first bracket portion 68 that is coupled to the second sidewall 15 of the housing 12 and a second bracket portion 70 that is pivotably coupled to the first bracket portion 68. According to some embodiments, a user may urge the access panel 50 to the open position which causes an end portion 72 of the access panel 50 to contact the pivot bracket 62 and/or hardware (e.g., fasteners) associated therewith. Such contact may in turn cause the pivot bracket 62 to pivot (e.g., the first and second bracket portions 68, 70 pivot relative to one another). A user may then remove the access panel 50 to provide access to the screen and motor assembly 14 as described in more detail below. According to some embodiments, the first and second bracket portions 68, 70 are not pivotable relative to one another. In such embodiments, and as described in more detail below, the access panel 50 may be removed by urging the access panel 50 downwardly against the magnetic force and pulling and/or rotating the access panel 50 away from the housing 12 such that the housing flange 54 is no longer received in the access panel channel 52.

Figure 6:
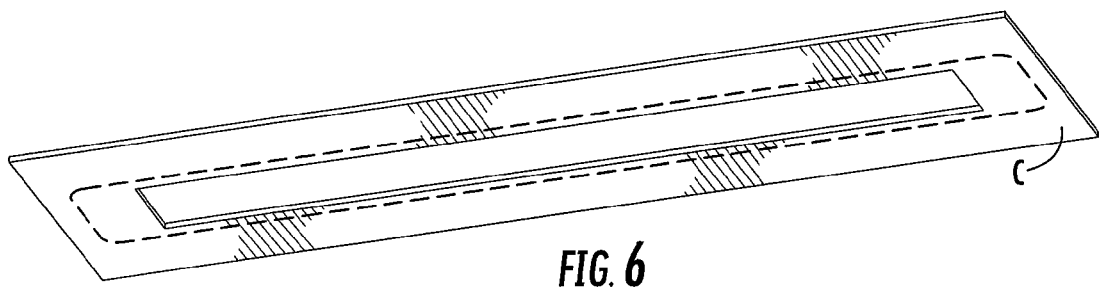
FIG. 6 illustrates ceiling preparation for installing the projection screen system of FIG. 1.

The installation of the projection screen system 10 will now be described. Referring to FIG. 6, for an existing ceiling C, a ceiling opening may be cut based on the size of the projection screen.

Figure 7A:
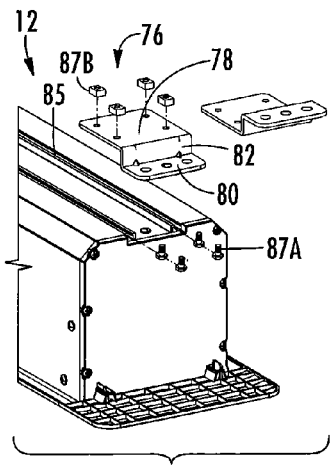
FIG. 7A illustrates a z bracket according to some embodiments.
Figure 7B:
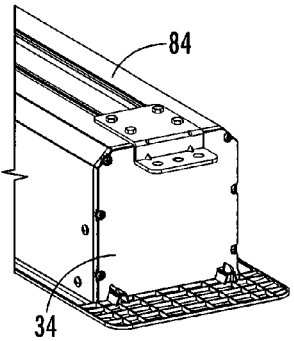
FIGS. 7B and 7C illustrate the mounting of the z bracket of FIG. 7A on a housing of the projection screen system of FIG. 1 in a down and an up position, respectively.
Figure 7C:
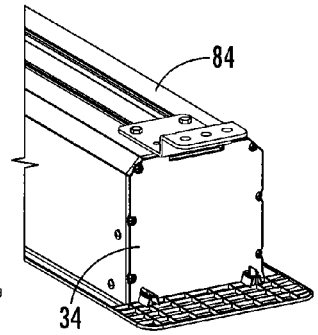

At least two different sets of brackets may be included with the screen system 10 and the installer may use the brackets best suited for the ceiling structure. Referring to FIGS. 7A-7C, z brackets 76 may be used for suspending the housing 12 at each end. The z bracket 76 includes first and second parallel portions 78, 80 and a third perpendicular portion 82 therebetween. The brackets 76 may be installed in a "down" position for threaded rod and/or suspended mounting or in an "up" position for direct ceiling mounting.

Referring to FIG. 7B, in the down position, the first portion 78 is coupled to a top portion or wall 84 of the housing 12. The third portion 82 extends downwardly down the end cap 32 or the end cap 34. The second portion 80 extends outwardly away from the third portion 82.

Referring to FIG. 7C, in the up position, the first portion 78 is coupled to the top wall 84 of the housing 12. The third portion 82 extends upwardly away from the housing top wall 84 (and may be flush or coplanar with the end cap 32 or the end cap 34). The second portion 80 extends outwardly away from the third portion 82. In either the up or the down position, the z brackets 76 may be mounted to a pair of parallel channels, grooves or rails 85 extending longitudinally on the top wall 84 of the housing 12 using fasteners 87A, 87B (e.g., bolts and nuts).

Figure 8:
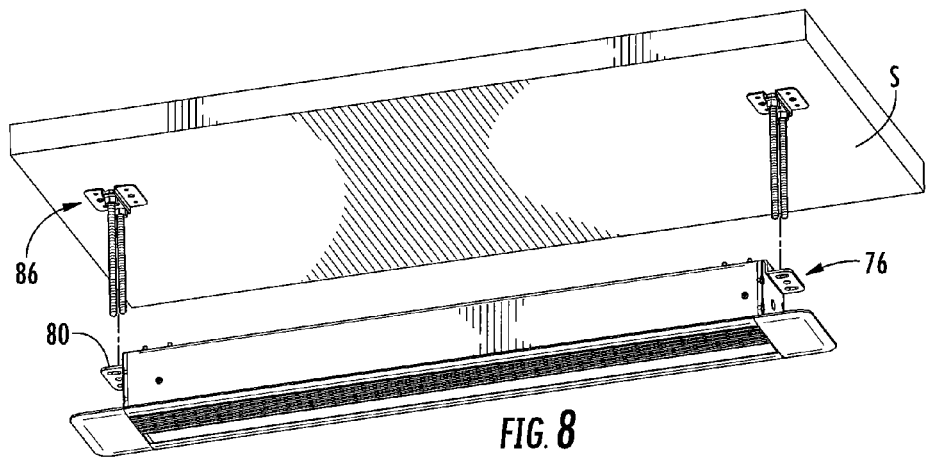
FIGS. 8-10 illustrate suspending the projection screen system of FIG. 1 or a housing thereof from a ceiling structure.
Figure 9:
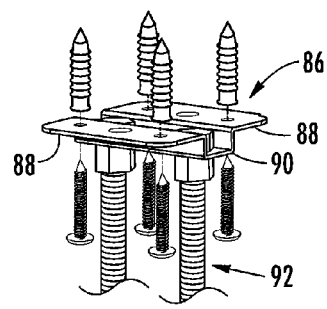
Figure 10:
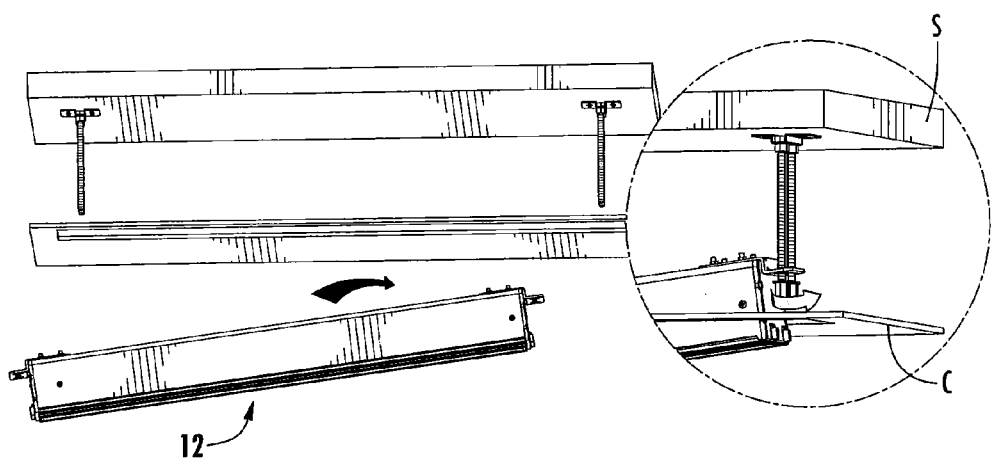

Referring to FIGS. 8 and 9, a ceiling bracket 86 includes a pair of side portions 88 and a center portion 90. The center portion is configured to receive one end portion of threaded rods 92 and the side portions 88 include apertures for mounting the ceiling bracket 86 to the ceiling structure S. With the z brackets 76 in the down position, apertures in the second portion 80 receive an opposite end portion of the threaded rods 92 to suspend the housing 12 from the ceiling structure S with the housing 12 recessed in the ceiling C (see FIG. 10).

Figure 11:
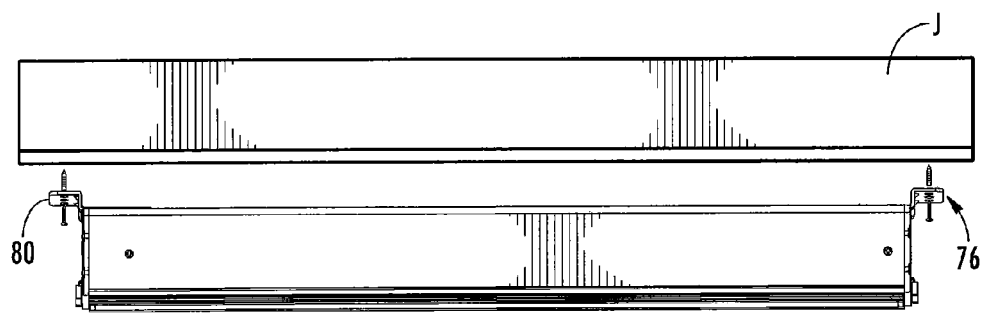
FIG. 11 illustrates hanging the projection screen system of FIG. 1 or a housing thereof from a wood joist.

The housing 12 may also be mounted to a ceiling structure such as a joist J as illustrated in FIG. 11. With the z brackets 76 in the up position, fasteners are received through apertures in the second portion 80 to mount the housing 12 to the joist J.

Figure 12:
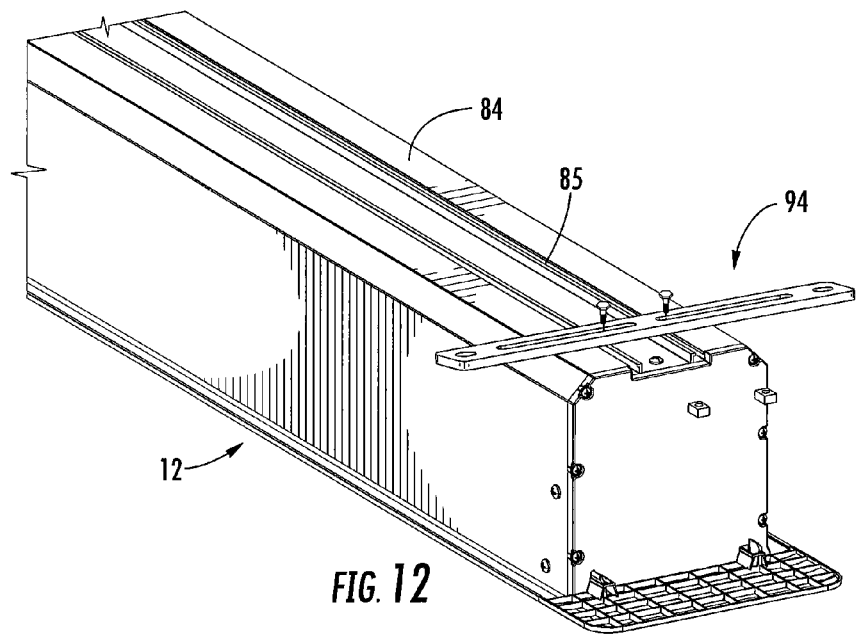
FIGS. 12 and 13 illustrate the mounting of flat brackets on a housing of the projection screen system of FIG. 1.
Figure 13:
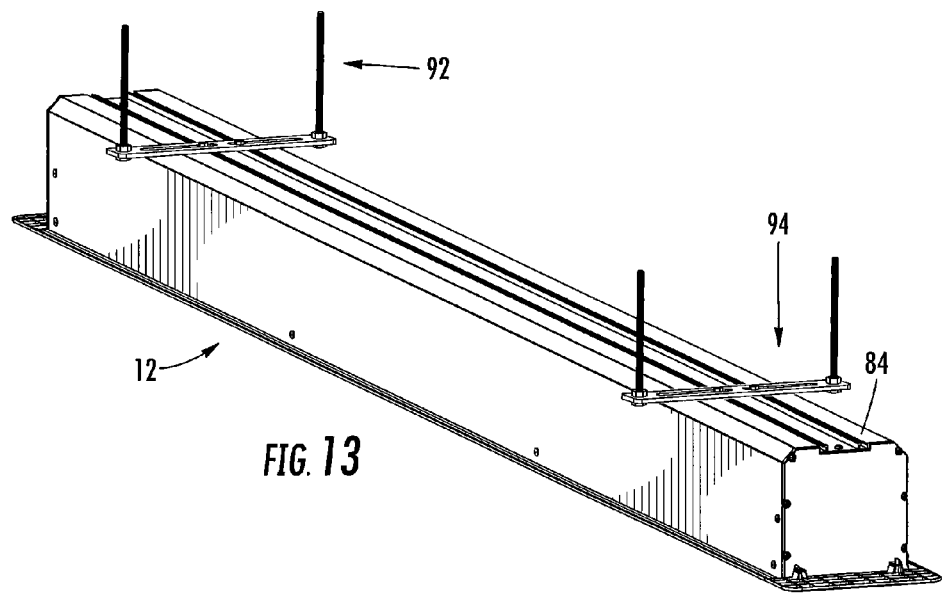

Referring to FIGS. 12 and 13, flat or straight brackets 94 may also be provided with the projection screen system 10. The flat brackets 94 may be used when the ceiling structure will not allow for the use of the z brackets. The flat brackets 94 may be coupled to the upper wall 84 of the housing 12. One end of threaded rods 92 may be received and secured in apertures of the flat brackets 94 and the opposite end of the threaded rods 92 may be coupled to the ceiling structure or to hardware (e.g., brackets) mounted thereto. The flat brackets 94 may be coupled to the upper wall 84 of the housing 12 in an off-centered configuration as needed to accommodate or fit the ceiling structure. The flat brackets 94 may be mounted to the top wall 84 of the housing 12 at locations spaced apart from the end caps 32, 34 using the rails 85 and the fasteners 87A, 87B (FIGS. 7A-7C).

Figure 14:
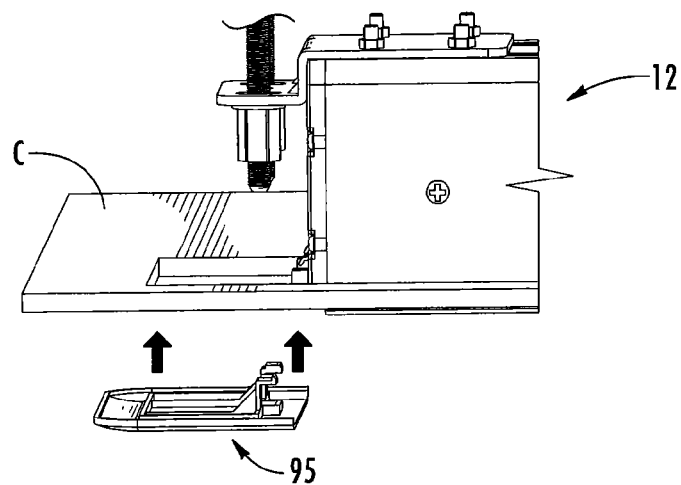
FIG. 14 illustrates the installation of trim caps adjacent the projection screen system of FIG. 1 or a housing thereof.

End trim caps 95 may be installed at opposite ends of the housing 12 after the housing 12 has been installed and leveled in the ceiling C (FIG. 14).

Figure 15:
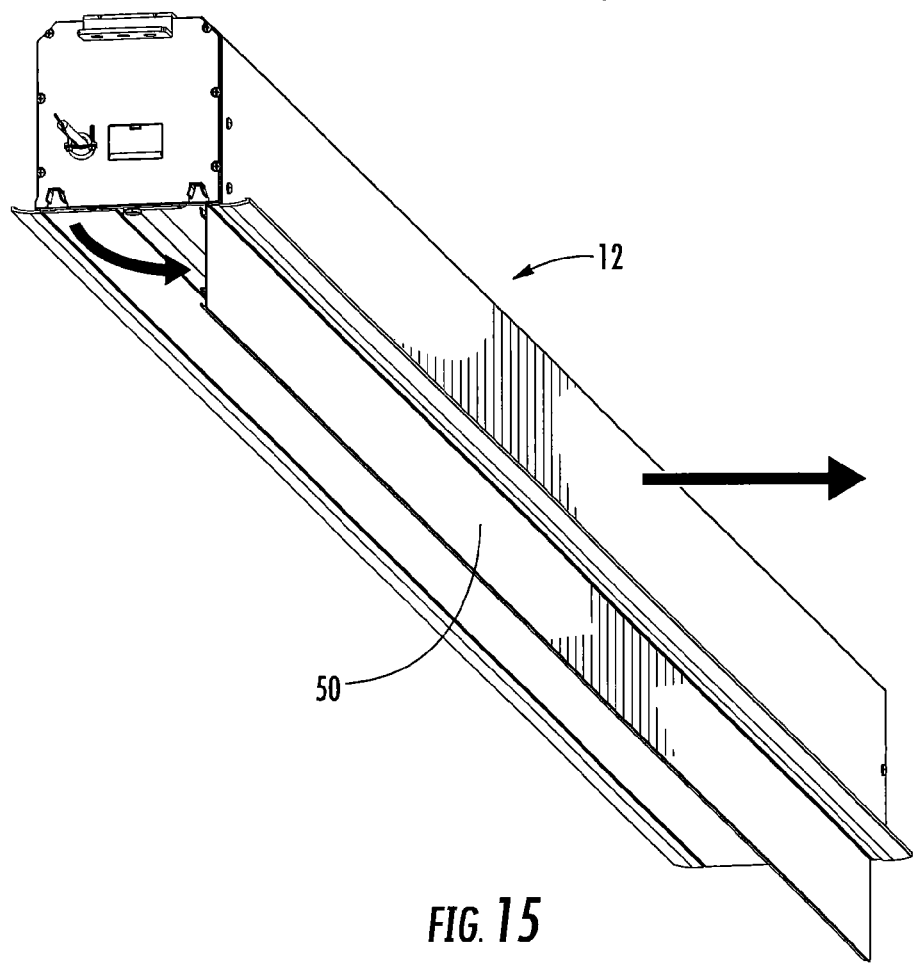
FIG. 15 illustrates the opening of an access panel located on the bottom of a housing of the projection screen system of FIG. 1.

Referring to FIG. 15, after the screen and motor assembly has been installed, the access panel 50 may be opened to access the electrical connection. As described above, the panel 50 may be held in place by magnetic brackets or tabs and is configured to swing open from back to front (i.e., toward the viewing area). According to some embodiments, the panel 50 may be disconnected from the housing 12 by opening the panel 50 about 45 degrees and pulling the panel 50 away from the housing 12.

Figure 16A:
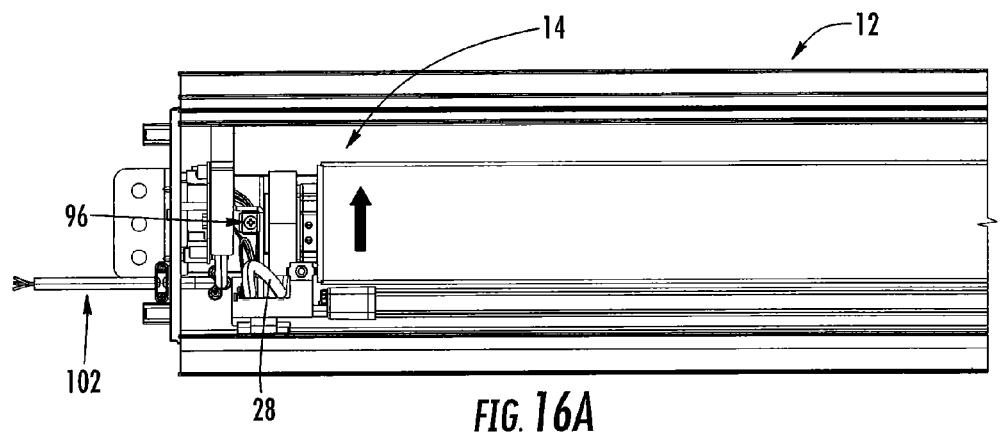
FIGS. 16A and 16B illustrate the removal of a screen and motor assembly from an installed housing of the projection screen system of FIG. 1.
Figure 16B:
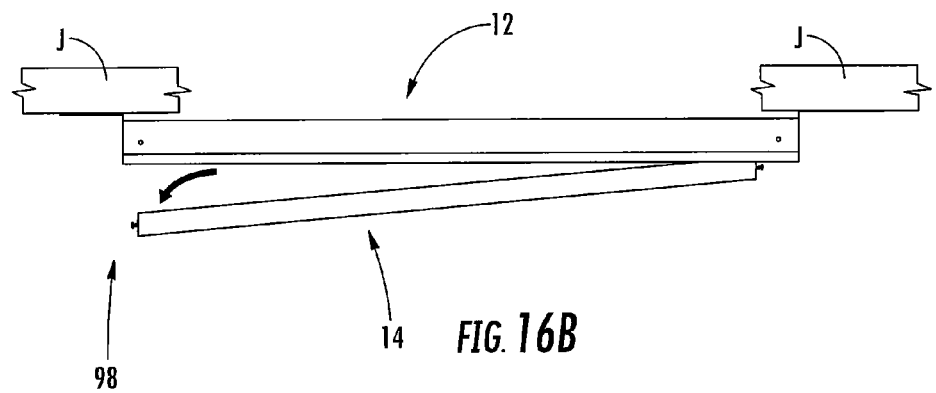

Referring to FIGS. 16A and 16B, the screen and motor assembly 14 can be removed from the housing 12 while the housing remains installed in the ceiling. This advantageously allows a user to service and/or replace the motor and/or screen without removing the housing 12 (which removal may damage the ceiling).

Figure 2:
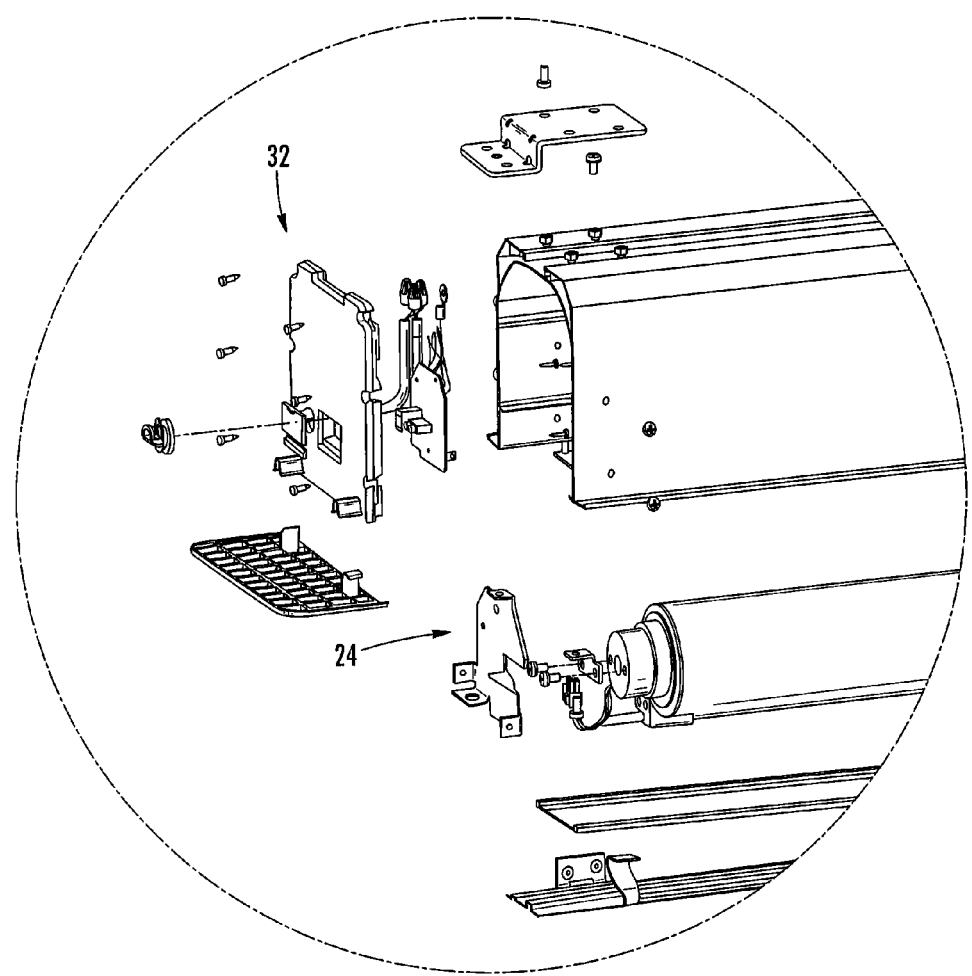
FIG. 2 is an exploded fragmentary view illustrating the indicated portion of FIG. 1.

The screen and motor assembly 14 may be removed as follows. The access panel 50 may be opened or removed as described above. The wiring harness 28 may be disconnected from the screen and motor assembly 14. A retaining screw 96 may be removed. According to some embodiments, the retaining screw 96 is in the motor bracket 24 (FIG. 2). The screen and motor assembly 14 may then be manipulated to remove the assembly 14 from the housing 12. For example, the screen and motor assembly 14 may be pushed up and toward the viewing area to loosen a first end 98 of the screen and motor assembly 14 from the housing 12. The screen and motor assembly 14 may then be removed from the housing 12 as indicated by the arrow in FIG. 16B.

The screen and motor assembly 14 can also be installed or reinstalled in the housing 12 with the housing 12 already mounted in the ceiling. That is, the housing 12 may be installed in the ceiling first and then the screen and motor assembly 14 can be installed in the housing 12 using a reverse process as described above. This is advantageous for installation because the housing 12 and the screen and motor assembly 14 together are heavy. Installing these two components sequentially facilitates easier and safer installation.

Figure 4:
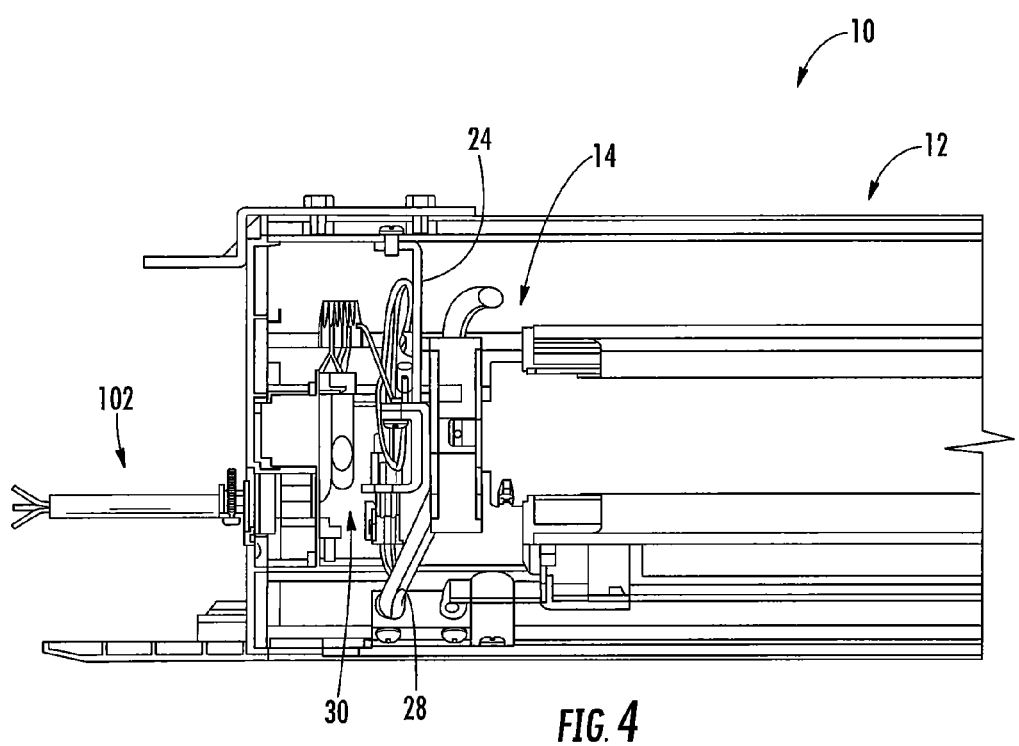
FIG. 4 is a fragmentary side sectional view of the projection screen system of FIG. 1.
Figure 5:
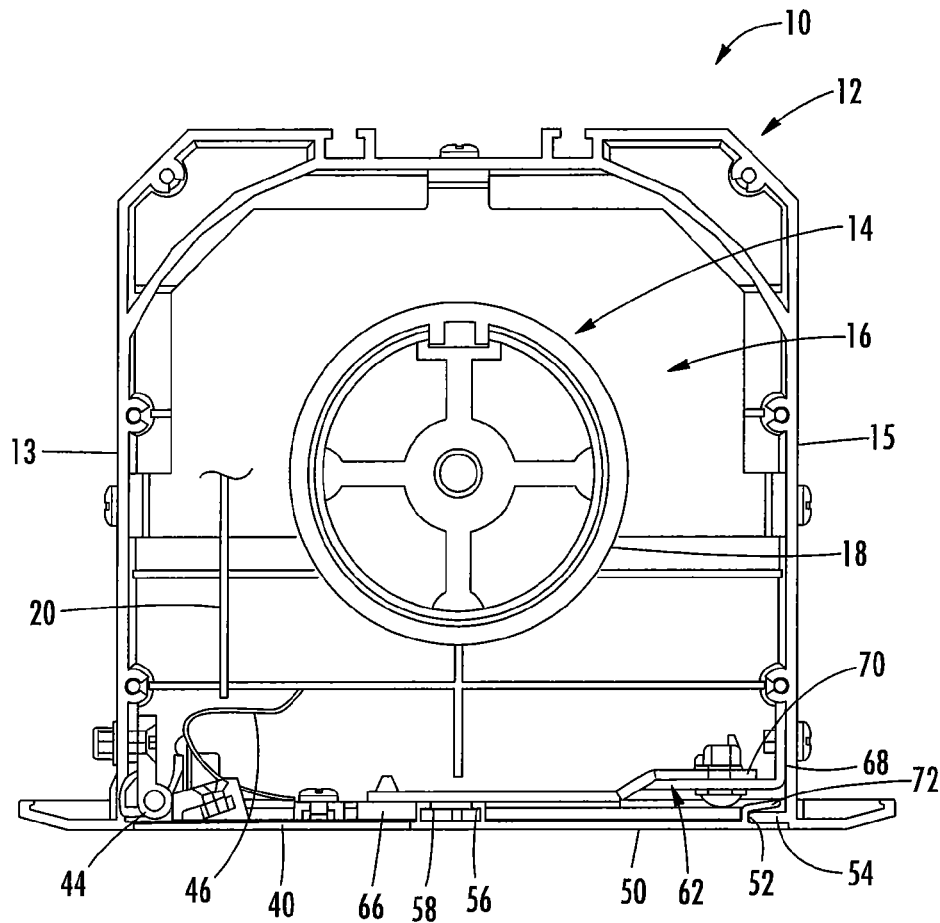
FIG. 5 is a fragmentary end sectional view of the projection screen system of FIG. 1.

For example, the housing 12 may be mounted in the ceiling in the manner described above in reference to FIGS. 6-13. Power wiring may be connected prior to the screen and motor assembly being installed in the mounted housing. Referring to FIGS. 4 and 16A, a power cord 102 may be electrically connected to a power source to provide power to the system.

Figure 17:
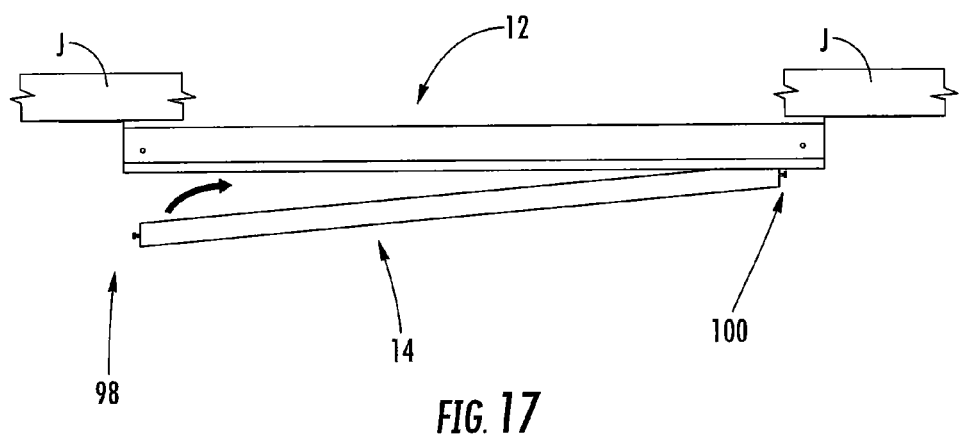
FIG. 17 illustrates the installation of a screen and motor assembly of the projection screen system of FIG. 1 into a housing of the projection screen system of FIG. 1 that has previously been installed in a ceiling.

The screen and motor assembly 14 may then be installed in the housing 12. As illustrated in FIG. 17, the screen and motor assembly 14 may be maneuvered into the channel 16 of the housing (FIG. 4) by first coupling a second end 100 of the screen and motor assembly 14 to a mounting feature adjacent the second end cap 34 such as the fixed end bracket 26 (FIG. 3). The first end 98 of the screen and motor assembly 14 may then be coupled to a mounting feature adjacent the first end cap 32 such as the motor bracket 24 (FIG. 2). The retaining screw 96 may be installed to further secure the screen and motor assembly 14 in the housing 12 (FIG. 16A). The wiring harness 28 may be connected to the screen and motor assembly 14 to provide the final connection.

Figure 18A:
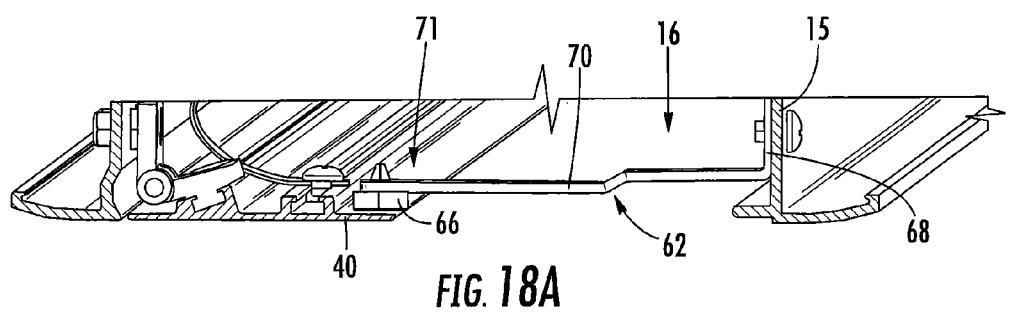
FIG. 18A is a fragmentary perspective view of a housing of the projection screen system of FIG. 1.
Figure 18B:
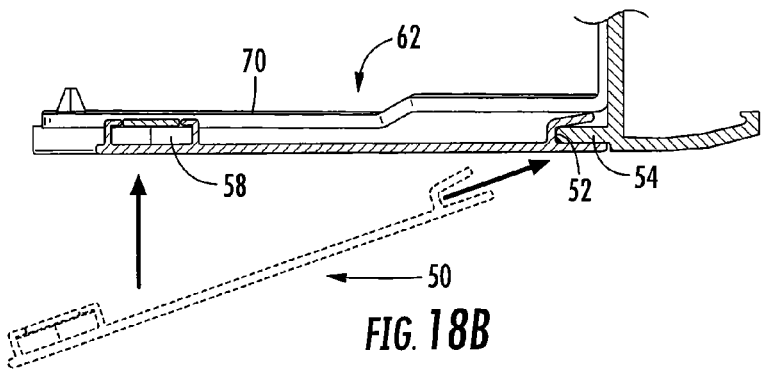
FIG. 18B is a fragmentary side view of the housing of FIG. 18A with an access panel being attached thereto.

The access panel 50 may thereafter be installed as illustrated in FIGS. 18A and 18B. Referring to FIG. 18A, each magnetic bracket 62 may include the first portion 68 that is coupled to the housing second sidewall 15 and the second portion 70 that extends inwardly in the cavity 16. A bumper 66 is on the pivot bracket second portion 70 at a distal end 71 thereof. The bumper 66 rests against the hinge door 40 to ensure proper alignment of the hinge door 40 and the access panel 50 to be installed.

The access panel 50 may be installed as illustrated in FIG. 18B. The housing flange 54 is received in the access panel channel 52. Each magnet 58 engages a respective one of the magnetic brackets 62 at the second portion 70 thereof. The access panel 50 is in the closed or installed position in FIG. 18B.

Therefore, the access panel 50 is held securely in place and provides an aesthetically pleasing flush appearance. The access panel 50 can be relatively easily removed from the installed position to provide access to the screen and motor assembly 14.

As described above in reference to FIG. 14, the end trim caps 95 be installed at opposite ends of the housing 12 before or after the access panel 50 is installed.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

What is claimed is:

1. A projection screen system comprising:
   a housing defining a channel;
   a screen and motor assembly comprising a projection screen and a tubular motor; and
   first and second opposed mounting features configured to hold the screen and motor assembly in the channel of the housing;
   wherein the housing is configured to be installed recessed in a ceiling and the screen and motor assembly is configured to be mounted in the housing of the installed housing such that the installation of the housing and the mounting of the screen and motor assembly are performed independently;
   wherein:
   the housing is elongated and includes first and second end portions;
   the housing comprises first and second opposite sidewalls and a top wall defining the channel;
   the system further comprises an elongated access panel releasably held in a closed position adjacent the second sidewall of the housing and extending from the first end portion to the second end portion of the housing;
   the access panel comprises first and second opposite side portions;
   the first side portion of the access panel comprises a channel extending lengthwise along the access panel;
   the housing comprises a flange extending lengthwise along the second sidewall of the housing;
   the flange of the housing is received in the channel of the access panel with the access panel in the closed position;
   a plurality of spaced apart magnetic brackets are coupled to the second sidewall of the housing and extend inwardly in the channel;
   a plurality of spaced apart magnets are on the second side portion of the access panel;
   a respective magnet is engaged with a respective magnetic bracket with the access panel in the closed position.

2. The system of claim 1 wherein the screen and motor assembly is configured to be removed from the housing with the housing still installed recessed in the ceiling.

3. The system of claim 1 wherein the first and second mounting features are first and second motor brackets.

4. The system of claim 3 further comprising a retaining screw in one of the first and second motor brackets that is configured to be removed to facilitate removing the screen and motor assembly from the housing.

5. The system of claim 1 wherein:
   each magnetic bracket comprises a first portion that is coupled to the housing second sidewall and a second portion that is generally perpendicular to the first portion and extends into the channel;
   a respective magnet is engaged with a respective magnetic bracket at the second portion of the magnetic bracket with the access panel in the closed position.

6. The system of claim 1 wherein:
   the system further comprises an elongated hinge door pivotably held adjacent the first sidewall of the housing and extending from the first end portion to the second end portion of the housing;
   the projection screen and the hinge door cooperate such that the hinge door pivots to an open position when the projection screen is lowered out of the housing channel and pivots to a closed position when the projection screen is raised into the housing channel.

7. The system of claim 6 wherein:
   a bumper is on a distal end of each magnetic bracket;
   each bumper rests against an upper portion of the hinge door when the hinge door is in the closed position.

8. The system of claim 1 wherein the access panel is removable to provide access to the screen and motor assembly.

9. A projection screen system comprising:
   a housing defining a channel;
   a screen and motor assembly comprising a projection screen and a tubular motor; and
   first and second opposed mounting features configured to hold the screen and motor assembly in the channel of the housing;
   wherein the housing is configured to be installed recessed in a ceiling and the screen and motor assembly is configured to be mounted in the housing of the installed housing such that the installation of the housing and the mounting of the screen and motor assembly are performed independently;
   wherein:
   the housing is elongated and includes first and second end portions;
   the housing comprises a first end cap at the first end portion and a second end cap at the second end portion;
   the housing comprises first and second opposite sidewalls and a top wall with the first and second sidewalls, the top wall and the first and second end caps defining the channel;
   the system further comprising a plurality of brackets to selectively install the housing in a variety of different ways, the plurality of brackets comprising:
   first and second z brackets, each z bracket comprising first and second parallel portions and a third portion between the first and second portions and perpendicular to the first and second portions, wherein the first and second z brackets are configured to be selectively mounted to the top wall of the housing at the first and second end portions, respectively, in a down configuration with the first portion coupled to the top wall of the housing and the second portion positioned below the top wall of the housing and in an up configuration with the first portion coupled to the top wall of the housing and the second portion positioned above the top wall of the housing.

10. The system of claim 9 wherein:
in the down configuration, the second portion of the first and second z brackets overhangs the first and second end caps, respectively, and the third portion of the first and second z brackets is adjacent the first and second end cap, respectively;
in the up configuration, the second portion of the first and second z brackets overhangs the first and second end caps, respectively, and the third portion of each of the first and second z brackets extends upwardly away from the top wall of the housing.

11. The system of claim 9 wherein the plurality of brackets comprises first and second flat brackets that are configured to be selectively mounted to the top wall of the housing at varying spaced apart locations thereof that are also spaced apart from the first and second end caps, and wherein the first and second flat brackets have a width that is greater than a width of the top wall of the housing.

12. A method comprising:
providing a projection screen system comprising:
a housing defining a channel;
a screen and motor assembly comprising a projection screen and a tubular motor; and
first and second opposed motor brackets configured to hold the screen and motor assembly in the channel of the housing;
installing the housing recessed in a ceiling; then
mounting the screen and motor assembly in the housing that is installed recessed in the ceiling; and then
installing an access panel by:
coupling a first end of the access panel to a sidewall of the housing; and
coupling a second end of the access panel comprising a plurality of magnets to a plurality of magnetic brackets that each extend from the sidewall of the housing into the channel.

13. The method of claim 12 further comprising connecting a PCB in the housing to power after installing the housing recessed in the ceiling and before mounting the screen and motor assembly in the housing.

14. The method of claim 13 further comprising connecting a wiring harness from the PCB to the screen and motor assembly after mounting the screen and motor assembly in the housing.

15. The method of claim 12 further comprising removing the screen and motor assembly from the housing while the housing remains installed recessed in the ceiling.

16. The method of claim 15 further comprising removing a retaining screw from one of the motor brackets prior to removing the screen and motor assembly from the housing while the housing remains installed recessed in the ceiling.

17. The method of claim 15 wherein removing the screen and motor assembly from the housing while the housing remains installed recessed in the ceiling comprises urging one end of the screen and motor assembly upwardly and to the side in the housing.

* * * * *